United States Patent Office 3,475,477
Patented Oct. 28, 1969

3,475,477
PROCESS FOR THE PRODUCTION OF
ALUMINUM ALKYLS
Ernst W. Muller, St. Augustin, Gunter Zoche, Ludwigshafen, and Friedrich W. A. G. K. Korte, Hangelar, Germany, assignors to Shell Oil Company, New York, N.Y., a corporation of Delaware
No Drawing. Continuation-in-part of application Ser. No. 323,052, Nov. 12, 1963. This application Aug. 15, 1966, Ser. No. 572,197
Claims priority, application Great Britain, Nov. 13, 1962, 42,944/62, Patent 1,006,843
Int. Cl. C07f 5/06; C07c 29/00
U.S. Cl. 260—448                                    6 Claims

ABSTRACT OF THE DISCLOSURE

Process for the manufacture of primary alcohols by isomerizing an aluminum secondary alkyl to an aluminum primary alkyl wherein the aluminum secondary alkyl is heated at 50° to 250° C. for about ½–10 hours with about 0.5–10 mole percent of Group IV–B catalyst, based on aluminum secondary alkyl, and oxidizing the resulting aluminum primary alkyl product to form an aluminum alkylate followed by hydrolysis of the alkylate to the corresponding alcohol.

---

This application is a continuation-in-part of copending application of E. W. Müller et al., U.S. Ser. No. 323,052, filed Nov. 12, 1963 and now abandoned.

This invention relates to the preparation of primary alcohols from internal olefins. More specifically, it relates to the preparation of aluminum primary alkyls by a catalytically accelerated structural isomerization of aluminum secondary alkyls and the subsequent conversion of the resulting aluminum primary alkyls to the corresponding alcohols.

Normal primary alcohols are particularly useful products, the higher primary alcohols being especially suitable as detergent intermediates. They may be obtained through a series of reactions, the first of which involves the conversion of aluminum secondary alkyls by an isomerization treatment into aluminum primary alkyls. Thermal isomerization as described in French Patent 1,285,405 can be employed, or a dispersion of finely divided sodium in an inert hydrocarbon can be used to catalyze the isomerization as described in U.S. 3,116,310. Subsequent oxidation of the resulting aluminum trialkyl with, for instance, air, produces the alkoxide which in turn can be hydrolyzed with, e.g., water or dilute acid to obtain the primary alcohol. This process for the production of primary alcohols has been limited by the fact that the thermal isomerization of the aluminum secondary alkyls requires a long reaction time and high temperature, while sodium dispersions are undesirably expensive, and inconvenient to use as catalysts.

It is, therefore, a principal object of the present invention to provide an efficient and economical method for converting aluminum secondary alkyls to aluminum primary alkyls by catalytic isomerization and to produce primary alcohols from the aluminum primary alkyls produced thereby.

These and other objects will be better understood from the description of the invention as given hereinafter.

Now, in accordance with this invention, it has been found that the rate of isomerization of aluminum secondary alkyls to aluminum primary alkyls is greatly enhanced when the conversion is performed in the presence of certain materials which catalyze the reaction. It has now been found that certain transition metals catalyze the reaction to such a degree that the conversion of aluminum secondary alkyls to aluminum primary alkyls becomes commercially feasible. The process comprises therefore reacting an aluminum secondary alkyl in the presence, as catalyst of a transition metal of Group IV–B of the Periodic Table of the Elements as published, for example in Lange's "Handbook of Chemistry," Tenth Edition (1961) McGraw-Hill Book Company, pages 58 and 59, i.e., the metals of atomic numbers 22, 40 and 72, namely titanium, zirconium and hafnium.

Catalysts with which surprisingly good results have been obtained are derived from compounds containing titanium and/or zirconium, with titanium being most preferred. The catalyst may be added to the aluminum secondary alkyl reactant in various forms. One convenient method is to add to the aluminum alkyl a compound of the catalyst metal.

There are advantages if the Group IV–B metal catalyst is added in the form of a compound containing an oxygen atom linking the metal with a carbon atom, such as alcoholate, phenolate or a chelate. Suitable compounds of this type are the methylates, ethylates, propylates, isopropylates, phenolates, cresolates, acetylacetonates, salicylates, benzoylacetonates, and 2-furoylacetonates, with alcoholates and chelates of β-diketones such as the acetylacetonates being particularly suitable, although salts of the chosen Group IV–B metal, for example, halides, especially chlorides of titanium, zirconium and hafnium are another useful form in which to add the catalyst in the new process.

By aluminum secondary alkyl is meant:

wherein R is a secondary alkyl of 4 to 30 carbon atoms and each R′ represents a primary or secondary alkyl or hydrogen. Advantageously the alkyl groups represented by R′ are primary alkyl groups of 1 to 20 carbon atoms or secondary alkyl groups of 3 to 20 carbon atoms. The invention offers special advantage with starting aluminum alkyls having at least one secondary alkyl of 8 to 20 carbon atoms.

Examples of the aluminum secondary alkyl starting materials are, for instance, di-sec.-dodecylaluminum hydride, di-isobutyl-sec.-octylaluminum, di-sec.-decyl-isopropylaluminum, di-sec.-tridecylaluminum hydride, di-sec. - nonylaluminum hydride, tri - pentadecylaluminum, and the like.

The aluminum secondary alkyl starting materials may be obtained by methods well known to the art, i.e., by reacting a non-alpha-olefin or a mixture of such olefins, e.g., a mixture of octenes having double bonds in various, mainly non-terminal positions, with a relatively low molecular weight aluminum alkyl such as, e.g., di-isobutylaluminum hydride. This reaction would result in the production of an aluminum secondary alkyl compound. Suitable non-alpha-olefins include: butene-2, pentene-2, hexene-2, or -3, octene-2, -3 or -4, decene-5 and tridecene-6. These may be obtained by, e.g., the dehydration of suitable alcohols or alcohol mixtures. Advantageously, a mixture of technical non-α-olefins is used, which preferably contains olefins of at least 8 carbon atoms per molecule. Such technical mixtures can be obtained, for example, from olefin fractions high in alpha-olefins such as are produced by thermal or catalytic cracking of petroleum hydrocarbon. These are usually fractionated into distillation cuts containing, for instance, $C_6$–$C_8$, $C_9$–$C_{13}$, $C_{12}$–$C_{16}$, and $C_{14}$–$C_{18}$ olefins. The alpha-olefins in such mixtures being much more reactive than the non-alpha-olefins, can be reacted preferentially, e.g., by polymerization, and the non-alpha-olefin content in the unreacted olefinic residue thus increased extensively. A product can be fractionated from this residue which is predominantly internal olefin and particularly useful in making aluminum secondary alkyls suitable as starting materials for the process of the invention.

By non-alpha-olefin is meant an olefinic hydrocarbon or a mixture of such hydrocarbons having the olefinic double bond in a position other than a terminal one in a substantial proportion of the molecules, in particular one in which at least 40% of the molecules and preferably at least 60%, have the olefinic double bond in a non-terminal position.

In carrying out the process, the chosen compound of the Group IV–B, metal is added to the reaction mixture in catalytic amounts, i.e., in an amount which may vary from, e.g., about 0.05 to about 10 mole percent, in particular from 0.5–5 mole percent, based on the amount of aluminum secondary alkyl compound employed. Smaller or larger amounts may be used, of course, if desired.

nected to the vessel. Excess octenes (21.3 grams) were then taken overhead, leaving a liquid colorless product which was di-isobutyl-octyl-aluminum.

The nature of the octyl groups present was determined by bubbling 11.9 grams of the product for 5 hours at room temperature with subsequent treatment for another 20 hours in pure oxygen. The oxidation product was added to 25 milliliters of 10% hydrochloric acid and thereafter extracted with ether. The extract was dried over sodium sulfate. The ether was taken overhead leaving a product containing in addition to isobutanol and a small amount of ether, 2.77 grams (77% of theory) of octanols. By — liquid chromatography—this product was found to contain 22.3% octanol-1 the remaining 77.7% being octanol-2, -3, and -4.

Two 11.9 gram samples of the di-isobutyl-secondary octyl aluminum were isomerized by heating at 110° C. for 8 hours after addition of 0.25 grams of zirconium tetrachloride, and 25 ml. of titanium tetraisopropylate, respectively. The resulting products were oxidized, hydrolyzed, and worked up in the same way as the foregoing control with the following results:

| Example | Catalyst | Amount | Yield of Octanols | | Product Composition, percent | |
|---|---|---|---|---|---|---|
| | | | Grams | Percent of Theory | Octanol-1 | Others |
| Control | | | 2.77 | 77 | 22.3 | 77.7 |
| I | $ZrCl_4$ | 0.25 grams | 2.4 | 67 | 53.8 | 46.2 |
| II | Ti-tetraisopropylate | 0.25 ml | 2.25 | 63 | 100 | 0 |

Suitable reaction conditions for preparation of aluminum primary alkyls according to the invention include temperatures from about 50° C. to about 250° C., preferably between 80° C. and 200° C., the reaction being conveniently carried out in an inert atmosphere such as nitrogen or argon. It has been found that at higher temperatures smaller amounts of catalyst and shorter reaction times are required. Thus, it has been found that at reaction temperatures between 150° C. and 250° C., the optimum amount of catalyst can be decreased to 0.1–2% mole. A reaction time 5–10 hours will generally be sufficient at temperatures between 100° C. and 150° C., while between 150° C. and 200° C. reaction times of ½–5 hours may be used. At temperatures above 180° C. some catalyst systems tend to decompose.

Although atmospheric pressure is preferred, variations in pressure have no adverse effect on the reaction; subatmospheric or superatmospheric pressures can be used.

The aluminum primary alkyls produced according to the invention can be converted into a variety of derivatives by reaction with, e.g., $SO_2$ producing sulfinic acids, or with $CO_2$ resulting in the formation of carboxylic acids. As previously pointed out the aluminum primary alkyls are preferably oxidized, e.g., with oxygen or air, to convert primary alkyl formed in the isomerization to an alcoholate group and form the corresponding aluminum alkylates. Subsequently the alkylates may be hydrolyzed to form the corresponding primary alcohols according to methods well known in the art.

The following specific examples of the invention will serve to illustrate more clearly the application of the invention but it is not to be construed as in any manner limiting the invention.

EXAMPLES I AND II 50 grams of diisobutyl aluminum hydride and 39.5 grams of a mixture of isomeric n-octanes (containing about 2% of octane-1, the remainder being n-octenes having double bond in an internal position) were placed in a suitable vessel at 110° C. for 70 hours. Negligible amounts of isobutene were collected in a cold trap con- Similar isomerization is achieved by substituting zirconium tetraethylate and titanium tetrachloride as catalysts under the foregoing conditions.

EXAMPLE III

Using the methods of the foregoing examples di-secondary dodecyl aluminum hydride is isomerized with about 2 mole percent of zirconium (IV) acetylacetonate, and on oxidation, hydrolysis and work up in the same way a good yield of normal dodecyl alcohol is obtained.

Substitution of titanium triethylate chloride or hafnium tetraisopropylate as isomerization catalysts produce similar results under analogous conditions.

EXAMPLE IV

Titanium tetraphenate and dicyclopentadienyl titanium dicarbonyl added to tri-secondary hexadecyl aluminum in amounts of about 2 mole percent with isomerization at 140° C. for 6 hours results in good yields of normal hexadecyl alcohol after oxidation and hydrolysis of the isomerization products.

We claim as our invention:

1. A process for isomerizing an aluminum secondary alkyl to an aluminum primary alkyl wherein the alkyl contains from 4 to 30 carbon atoms by heating the aluminum secondary alkyl at 50° to 250° C. for about ½ to about 10 hours with as catalyst about 0.5 to about 10 mole percent of Group IV–B metal compounds selected from the group consisting of alcoholates, phenolates, beta-ketone chelates, and chlorides, said mole percent based on said aluminum secondary alkyl.

2. A process in accordance with claim 1 wherein titanium catalyst is used for the isomerization.

3. A process in accordance with claim 2 wherein the isomerization catalyst is added as alcoholate.

4. A process in accordance with claim 3 wherein titanium tetra-isopropylate is added in the isomerization.

5. A process in accordance with claim 1 wherein zirconium catalyst is used for the isomerization.

6. A process in accordance with claim 1 wherein the isomerization is performed in an inert atmosphere with 0.5 to 5 mole percent of said catalyst using a reaction time of 5 to 10 hours and a temperature between about 100° and about 150° C.

References Cited

UNITED STATES PATENTS 3,116,310  12/1963  Barie et al.
3,282,974  11/1966  Bruno et al.
3,322,806  5/1967  Asinger et al.

FOREIGN PATENTS 1,006,843  10/1965  Great Britain.
1,285,405  1/1962  France.
1,365,413  5/1964  France.

TOBIAS E. LEVOW, Primary Examiner
H. M. S. SNEED, Assistant Examiner

U.S. Cl. X.R.

260—632